United States Patent
Aoki

(10) Patent No.: US 10,556,619 B2
(45) Date of Patent: Feb. 11, 2020

(54) STEERING CONTROL APPARATUS

(71) Applicant: DENSO CORPORATION, Kariya, Aichi-pref. (JP)

(72) Inventor: Takashi Aoki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 190 days.

(21) Appl. No.: 15/697,180

(22) Filed: Sep. 6, 2017

(65) Prior Publication Data

US 2018/0065659 A1  Mar. 8, 2018

(30) Foreign Application Priority Data

Sep. 7, 2016 (JP) .................................. 2016-174507

(51) Int. Cl.
  *B62D 5/04* (2006.01)
  *B62D 6/00* (2006.01)
(52) U.S. Cl.
  CPC ......... *B62D 5/0466* (2013.01); *B62D 5/0409* (2013.01); *B62D 5/0463* (2013.01); *B62D 6/008* (2013.01)
(58) Field of Classification Search
  CPC ..................................... B62D 5/04; B62D 6/00
  See application file for complete search history.

(56) References Cited

U.S. PATENT DOCUMENTS

| | | | | |
|---|---|---|---|---|
| 2009/0266641 | A1* | 10/2009 | Ehara | B62D 5/0466 180/446 |
| 2014/0129089 | A1* | 5/2014 | Takeuchi | B62D 5/0466 701/41 |
| 2016/0347358 | A1* | 12/2016 | Gotou | B62D 5/0463 |
| 2016/0347359 | A1* | 12/2016 | Ueyama | B62D 5/0463 |
| 2017/0015351 | A1* | 1/2017 | Endo | B62D 6/00 |
| 2017/0166246 | A1* | 6/2017 | Gotou | B62D 5/0466 |
| 2017/0183028 | A1* | 6/2017 | Kitazume | B62D 5/0466 |
| 2018/0065658 | A1 | 3/2018 | Aoki | |
| 2018/0065660 | A1 | 3/2018 | Aoki | |

FOREIGN PATENT DOCUMENTS

| | | |
|---|---|---|
| JP | 2007-261550 | 10/2007 |
| JP | 4959217 B2 | 6/2012 |

* cited by examiner

*Primary Examiner* — Kira Nguyen
(74) *Attorney, Agent, or Firm* — Knobbe, Martens, Olson & Bear, LLP

(57) ABSTRACT

In a steering control apparatus, a basic assistance torque calculating unit calculates a basic assistance torque. A return control unit calculates a return control amount to assist in returning a steering wheel to a neutral position, as a correction torque to be added to the basic assistance torque. In the return control unit, a target steering speed calculating unit calculates a target steering speed being that is a target value for a steering speed. A return control amount calculating unit calculates the return control amount such that the steering speed follows the target steering speed. A returning state determining unit determines whether the steering wheel is turning or returning. The target steering speed calculating unit gradually increases an absolute value of the target steering speed from an absolute value of the steering speed when the steering wheel is returning.

7 Claims, 10 Drawing Sheets

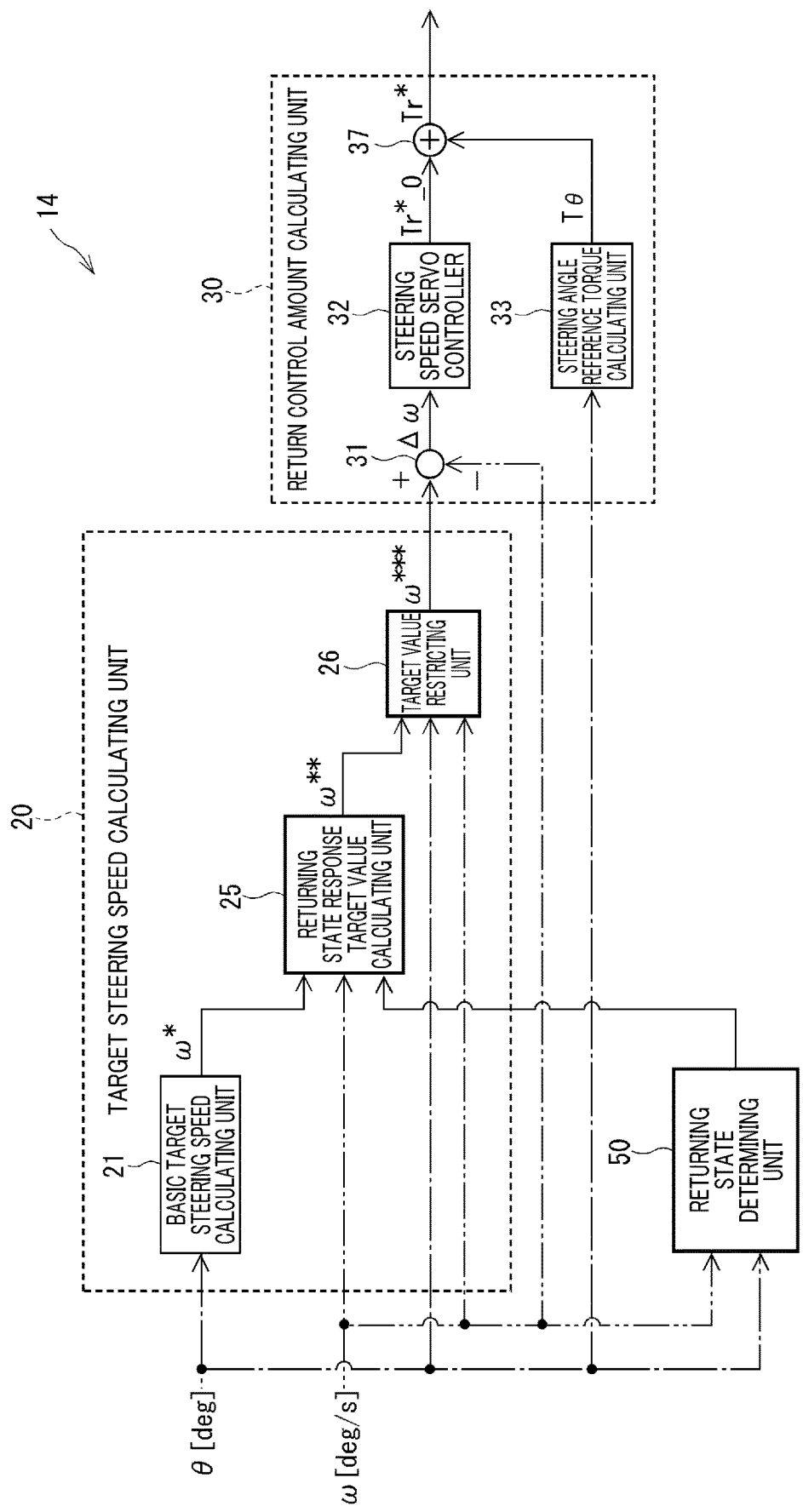

STEERING CONTROL APPARATUS

CROSS-REFERENCE TO RELATED APPLICATIONS

This application is based on and claims the benefit of priority from Japanese Patent Application No. 2016-174507, filed Sep. 7, 2016. The entire disclosure of the above application is incorporated herein by reference.

BACKGROUND

1. Technical Field

The present disclosure relates to a steering control apparatus.

2. Related Art

In a low vehicle-speed range, the sideslip angle of a vehicle body or a tire is relatively smaller than that when the vehicle speed is high. At the same steering angle and lateral acceleration, a self-aligning torque received from a road surface is smaller in the low-vehicle speed range. When the self-aligning torque becomes about equal to or less than friction in a steering mechanism, the steering wheel does not easily return to a neutral position. Consequently, a driver is required to intentionally perform an operation to return the steering wheel to the neutral position. Therefore, conventionally, a steering control apparatus that performs "return control" is known. In the return control, a correction torque in a direction in which the steering wheel returns to the neutral position is calculated and added to an assistance torque.

For example, Japanese Patent Publication No. 4959217 discloses an apparatus in which a following problem is considered. That is, stable steering at a small steering angle, and particularly at a low vehicle speed, becomes difficult to perform when the return control is performed while the driver is maintaining steady steering. Here, as a means for solving this problem, a gain of which the value is 1 when a steering torque is 0, and gradually approaches 0 as the steering torque increases from 0 in a negative or positive direction, is calculated. The gain is then multiplied with a return torque, and output of the return control during steady steering is suppressed.

In the return control in Japanese Patent Publication No. 4959217, a steering speed is controlled such as to follow a target steering speed. The output of the return control is calculated based on a deviation between the target steering speed and the steering speed. In this case, the output of the return control increases as the deviation between a detection value of the steering speed and the target steering speed increases. Therefore, a returning speed of a steering wheel suddenly increases, and a driver may experience discomfort.

SUMMARY

It is thus desired to provide a steering control apparatus that suppresses sudden changes in a returning speed during return control in which a return control amount is calculated such that a steering speed follows a target steering speed.

An exemplary embodiment provides a steering control apparatus that controls an assistance torque outputted by a steering assistance motor based on a steering torque applied by a driver. The steering control apparatus includes a basic assistance torque calculating unit that calculates a basic assistance torque and a return control unit. The return control unit calculates a return control amount to assist in returning a steering wheel to a neutral position, as a correction torque to be added to the basic assistance torque.

The return control unit includes a target steering speed calculating unit, a return control amount calculating unit, and a returning state determining unit. The target steering speed calculating unit calculates a target steering speed that is a target value for a steering speed. The return control amount calculating unit calculates the return control amount such that the steering speed follows the target steering speed. The returning state determining unit determines whether the steering wheel is turning or returning. The target steering speed calculating unit gradually increases an absolute value of the target steering speed from an absolute value of the steering speed when the steering wheel is returning.

The steering control apparatus of the present disclosure gradually increases a returning speed of the steering wheel by gradually increasing the absolute value of the target steering speed from the absolute value of the steering speed when the steering wheel is returning. Consequently, a problem of the returning speed of the steering wheel suddenly increasing and causing the driver discomfort, which is an issue in the conventional technology in Japanese Patent Publication No. 4959217, can be prevented. As a result, sudden changes in the returning speed can be suppressed.

Specifically, the returning state determining unit determines whether the steering wheel is in a turning state in which the steering wheel position is changing in a direction away from the neutral position or a returning state in which the steering wheel position is changing in a direction towards the neutral position.

The target steering speed calculating unit preferably sets the target steering speed to be equal to the steering speed in the turning state. As a result, the deviation between the target steering speed and the steering speed becomes 0. The return control amount calculating unit does not output the return control amount. Therefore, steering by the driver being inhibited during turn steering can be prevented.

In addition, the returning state determining unit preferably determines the returning state based on a return state quantity calculated from steering wheel position-related information correlated with the steering wheel position and a time rate of change of the steering wheel position-related information. The steering wheel position-related information is typically a steering angle. The time rate of change of the steering wheel position-related information is typically the steering speed. The returning state determining unit calculates the return state quantity based on a product of an angle state quantity determined based on the steering angle and a speed state quantity based on the steering speed.

BRIEF DESCRIPTION OF THE DRAWINGS

In the accompanying drawings:

FIG. 3 is an overall control block diagram of a return control unit according to an embodiment;

DESCRIPTION OF THE EMBODIMENTS

Embodiment

An embodiment of a steering control apparatus will hereinafter be described with reference to the drawings. According to the embodiment, an electronic control unit (ECU) serving as the "steering control apparatus" is applied to an electric power steering system of a vehicle. The ECU controls an assistance torque that is outputted from a steering assistance motor.

[Configuration of the Electric Power Steering System]

Figure 1:
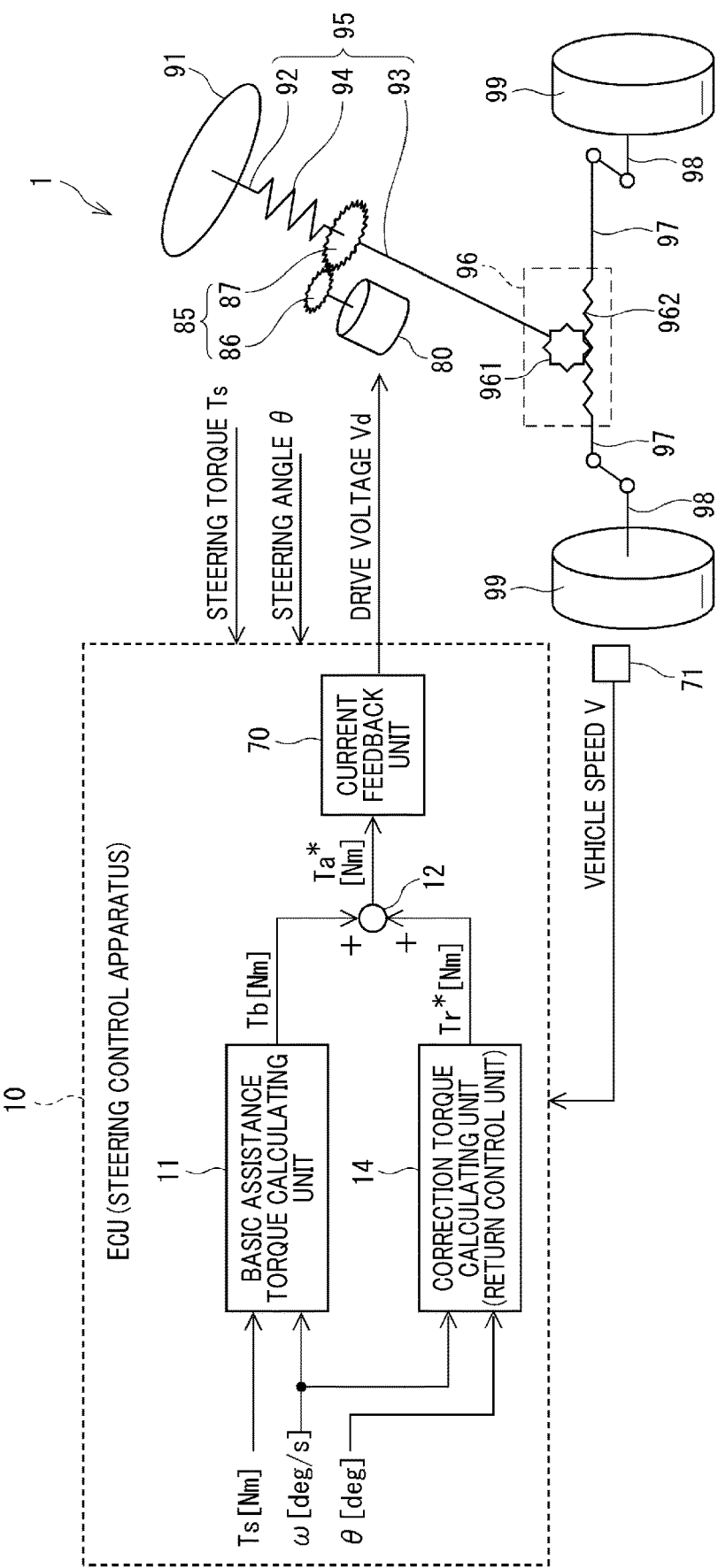
FIG. 1 is an overall configuration diagram of an electric power steering system.

As shown in FIG. 1, an electric power steering system 1 assists a driver in operating a steering wheel 91 using torque from a steering assistance motor 80.

The steering wheel 91 is fixed to an end of a steering shaft 92. An intermediate shaft 93 is provided on the other end side of the steering shaft 92. A torque sensor 94 is provided between the steering shaft 92 and the intermediate shaft 93. An overall shaft from the steering shaft 92, through the torque sensor 94, to the intermediate shaft 93 is collectively referred to as a steering shaft section 95.

The torque sensor 94 detects a steering torque Ts that is applied to a torsion bar that connects the steering shaft 92 and the intermediate shaft 93, based on an angle of torsion of the torsion bar. A detection value of the torque sensor 94 is outputted to the ECU 10. A gear box 96 is provided in an end portion of the intermediate shaft 93 on the side opposite the torque sensor 94. The gear box 96 includes a pinion gear 961 and a rack 962.

When the driver turns the steering wheel 91, the pinion gear 961 rotates together with the intermediate shaft 93. The rack 962 moves leftward or rightward in accompaniment with the rotation of the pinion gear 961. Tie rods 97 are provided on both ends of the rack 962. The tie rods 97 move leftward and rightward in a reciprocating manner, together with the rack 962. An orientation of a wheel 99 changes as a result of the tie rod 97 pulling and pushing a knuckle arm 98. In addition, a vehicle speed sensor 71 is provided in a predetermined section of the vehicle. The vehicle speed sensor 71 detects a vehicle speed V.

For example, the motor 80 is a three-phase brushless alternating-current motor. The motor 80 outputs an assistance torque based on a drive voltage Vd outputted from the ECU 10. The assistance torque assists with a steering force of the steering wheel 91. In the case of the three-phase alternating-current motor, the drive voltage Vd refers to a phase voltage of each phase, that is, a U phase, a V phase, and a W phase. Rotation of the motor 80 is transmitted to the intermediate shaft 93 via a reduction mechanism 85. The reduction mechanism 85 has a worm gear 86 and a worm wheel 87. In addition, when the intermediate shaft 93 rotates as a result of a self-aligning torque or road-surface reaction force from the wheel 99 side, the rotation is transmitted to the motor 80 via the reduction mechanism 85.

The electric power steering system 1 shown in FIG. 1 is a column-assisted type in which the rotation of the motor 80 is transmitted to the steering shaft section 95. However, the ECU 10 according to the present embodiment can be similarly applied to a rack-assisted-type electric power steering system or a steer-by-wire system. In the steer-by-wire system, the steering wheel and steered wheels are mechanically separated. In addition, according to another embodiment, a multiple-phase alternating-current motor that has a number of phases other than three, or a brushed direct-current motor may be used as the steering assistance motor.

The ECU 10 is operated by electric power received from an on-board battery (not shown). The ECU 10 calculates an assistance torque command Ta* based on the steering torque Ts detected by the torque sensor 94, the vehicle speed V detected by the vehicle speed sensor 71, and the like. Then, the ECU 10 applies the drive voltage Vd calculated based on the assistance torque command Ta* to the motor 80, thereby making the motor 80 generate the assistance torque. The various calculation processes performed by the ECU 10 may be software processes actualized by a central processing unit (CPU) running programs stored in advance in a tangible memory device, such as a read-only memory (ROM). Alternatively, the various calculation processes may be actualized by hardware processes performed by dedicated electronic circuits.

The ECU 10 includes a basic assistance torque calculating unit 11, a correction torque calculating unit 14, and a current feedback unit 70. The basic assistance torque calculating unit 11 calculates a basic assistance torque Tb based on the steering torque Ts and a steering speed ω. The correction torque calculating unit 14 calculates various types of correction torque to be added to the basic assistance torque Tb. However, according to the present embodiment, focus is placed only on a return control amount Tr* for return control, as the correction torque. Other types of correction torque will not be mentioned. Therefore, the "correction torque calculating unit" will specifically be described hereafter as a "return control unit 14."

The return control unit 14 calculates the return control amount Tr* based on the steering speed ω and a steering angle θ. An adder 12 adds the return control amount Tr* calculated by the return control unit 14 to the basic assistance torque Tb. The assistance torque command Ta* is thereby calculated.

Units, such as [Nm], [deg], and [deg/s], that are used regarding various quantities serve to express dimensions of these quantities and are not intended to limit usage thereto. For example, [rad] may be used as the unit for angles. A similar interpretation also applies to the drawings hereafter. Furthermore, the terms "steering angle θ" and "steering speed ω" are used not only for cases in which the steering wheel 91 is rotated through active steering by the driver, but also in an expansive manner to include the position and rotation speed of the steering wheel 91 in a state in which the driver has let go of the steering wheel 91.

The current feedback unit 70 performs feedback control of an actual current flowing to the motor 80 in relation to a target current based on the assistance torque command Ta*, and thereby calculates the drive voltage Vd applied to the motor 80. Configurations of the basic assistance torque calculating unit 11 and the current feedback unit 70 in the steering control apparatus are known technology. Therefore, detailed descriptions thereof are omitted.

[Overview of the Return Control]

Next, an overview of the return control will be described with reference to FIG. 2.

In a low vehicle-speed range, the sideslip angle of a vehicle body or a tire is relatively smaller than that when the vehicle speed is high. At the same steering angle and lateral acceleration, the self-aligning torque received from a road surface is smaller in the low-vehicle speed range. When the self-aligning torque becomes about equal to or less than the friction in the steering mechanism, the steering wheel does not easily return to the neutral position. Consequently, the driver is required to intentionally perform an operation to return the steering wheel to the neutral position.

Specifically, returning force is small in vehicles in which a toe angle and a caster trail are small, and in vehicles fitted with tires having low rolling resistance. In addition, friction is high in vehicles in which contact pressure against components is set to be high to reduce rattling noise of the rack and pinion mechanism. Each of the foregoing serves as a factor in inhibiting the return of the steering wheel to the neutral position.

Regarding such issues, the return control is control in which a correction torque in the direction in which the steering wheel returns to the neutral position is further added to the assistance torque in the electric power steering system.

Hereafter, in the present specification, a direction in which the steering wheel moves away from the neutral position is referred to as a "turning direction." The direction in which the steering wheel moves towards the neutral position is referred to as a "returning direction." That is, the "returning/turning direction" is objectively defined based on a relationship between the steering wheel and the neutral position, regardless of the senses of the driver.

Steering in the turning direction and steering in the returning direction are respectively referred to as "turn steering" and "return steering." In addition, a speed at which the steering wheel returns to the neutral position as a result of the self-aligning torque and the return control, even without the driver actively performing an operation to return the steering wheel, is referred to as a "returning speed."

Figure 2A:
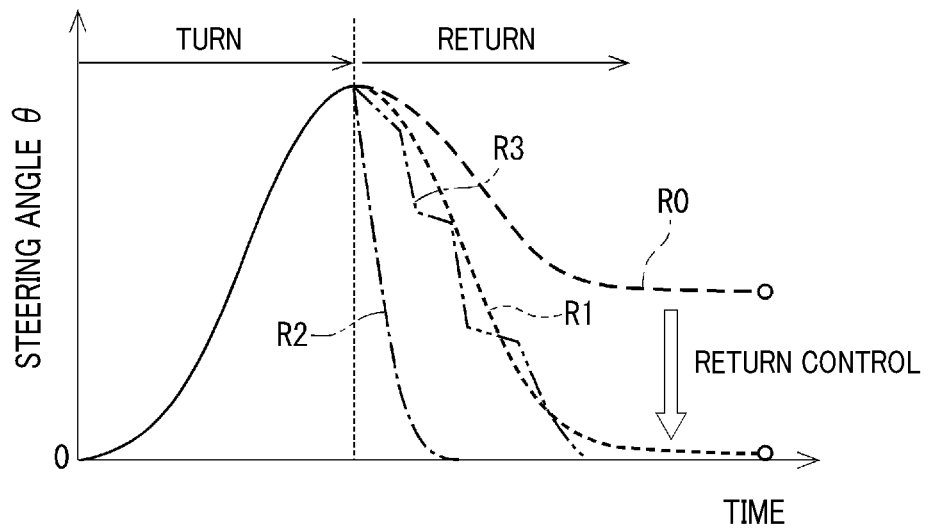
FIG. 2A is a diagram of changes over time in steering angle.

FIG. 2A is a conceptual diagram showing changes over time in the steering angle θ until the steering wheel returns to the neutral position (that is, steering angle θ=0 [deg]) after the turn steering, in a state in which the driver has their hands on the steering wheel. A long broken line R0 indicates an operation in a case in which the steering angle θ does not return to 0 [deg] as a result of friction, when the return control is not performed or when the output of the return control is insufficient and the returning speed is too slow.

Conversely, a short broken line R1 indicates an operation in which the steering wheel returns to the neutral position as a result of favorable return control. Because the returning speed is appropriate, the steering angle θ changes smoothly.

In addition, a single-dot chain line R2 and a two-dot chain line R3 show examples of inappropriate return control. In an operation indicated by the single-dot chain line R2, the output of the return control is excessive and the returning speed is too fast. Consequently, steering is inhibited. In an operation indicated by the two-dot chain line R3, the returning speed is unstable. Consequently, the driver may experience discomfort. Therefore, in the return control, a control goal is to actualize the operation indicated by the short broken line R1 in which steering is not inhibited and the steering wheel returns at a natural speed that does not cause discomfort.

Figure 2B:
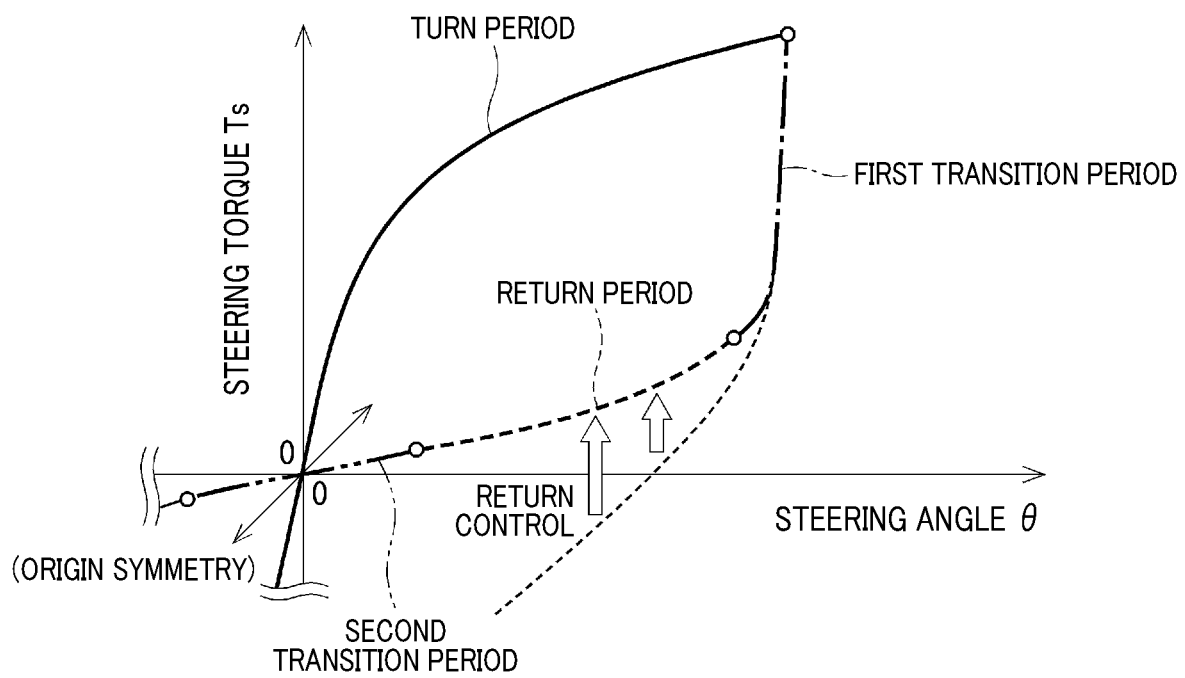
FIG. 2B is a diagram of changes in state during transition from turn steering to return steering, in return control.

FIG. 2B is a diagram that expresses changes in state during transition from the turn steering to the return steering, based on a relationship between the steering angle θ and the steering torque Ts. Here, positive and negative signs of the steering angle θ are defined based on leftward and rightward directions with reference to the neutral position. In addition, signs of the steering torque Ts are defined based on the same directions as the directions indicated by the signs of the steering angle θ. Basically, when the steering torque Ts is applied in a positive direction, the steering angle θ changes to a positive direction. When the steering torque Ts is applied in a negative direction, the steering angle θ changes to a negative direction. FIG. 2B shows a diagram in which the steering angle θ and the steering torque Ts are both in the positive region. A diagram in which the steering angle θ and the steering torque Ts are both in the negative region will appear to be symmetrical to the diagram in FIG. 2B with respect to the origin.

The changes in state during the transition of steering are divided into four periods, that is, a "turn period" indicated by a solid line, a "first transition period" indicated by a single-dot chain line, a "return period" indicated by a broken line, and a "second transition period" indicated by a two-dot chain line.

During the turn period in which the driver is turning the steering wheel, an absolute value of the steering angle θ increases. Curve shapes in FIG. 2B are merely an example. During the turn period, the return control is not performed so as not to inhibit steering. When the driver starts to return the steering wheel to the neutral position, the steering angle θ hardly changes. An absolute value of the steering speed ω is relatively small. During this first transition period, when the return control is actively performed, the driver experiences a strong returning sensation. Therefore, the return control is gradually started.

During the return period in which the driver is returning the steering wheel to the neutral position, the absolute value of the steering angle θ decreases. During the return period, the return control is actively performed. As a result, a curve expressed by a thin broken line that indicates "when the return control is not performed" is corrected such that the tip of the curve faces the point of origin. During the second transition period in which the steering wheel is near the neutral position, the absolute value of the steering angle θ gradually approaches zero over a relatively small range. The return control is gradually ended during this period.

In addition, respective steering states during the return period, the turn period, and the transition periods are referred to as a "returning state," a "turning state," and a "transitioning state." The returning state is defined as "a state in which the steering wheel position is changing towards the neutral position." The turning state is defined as "a state in which the steering wheel position is changing in the direction away from the neutral position."

Information quantitatively expressing the returning state is a "return state quantity α" that is calculated by a returning state determining unit 50, described hereafter. The return state quantity α during each period in FIG. 2B is "α=0" during the turn period, "α=1" during the return period, and "0<α<1" during the first and second transition periods.

Japanese Patent Publication No. 4959217 discloses a conventional technology in which the steering speed is controlled such as to follow the target steering speed, and the output of the return control is calculated based on the deviation between the target steering speed and the steering speed. However, the output of the return control increases as the deviation between the detection value of the steering speed and the target steering speed increases. Therefore, the returning speed of the steering wheel suddenly increases, and the driver may experience discomfort.

With regard to this problem, the return control unit 14 according to the present embodiment sets a lower-limit value of the absolute value of the target steering speed to be equal to the absolute value of the steering speed ω when the steering speed ω is controlled such as to track the target steering speed. In the returning state, the absolute value of the target steering speed is gradually increased from the absolute value of the steering speed ω. As a result, in the returning state, the returning speed of the steering wheel is gradually increased.

Next, a configuration of the return control unit 14 will be described in detail.

[Configuration of the Return Control Unit]

An overall configuration of the return control unit 14 is shown in FIG. 3.

The return control unit 14 is largely configured by three blocks, that is, a target steering speed calculating unit 20, a return control amount calculating unit 30, and a returning state determining unit 50. In simple terms, the functions of the three blocks are as follows: the target steering speed calculating unit 20 calculates a target steering speed ω* for when the steering wheel returns to the neutral position; the return control amount calculating unit 30 calculates a returning force command value for the returning force that returns the steering wheel to the neutral position; and the returning state determining unit 50** determines whether the steering wheel is turning or returning.

The steering angle θ and the steering speed ω are inputted to the return control unit 14 as information quantities used for calculation in each block. In the overall configuration diagram in FIG. 3, input of the steering angle θ is indicated by a single-dot chain line and input of the steering speed ω is indicated by a two-dot chain line, taking into consideration visibility of the drawings. All calculation results outputted from these blocks are indicated by solid lines.

The target steering speed calculating unit 20 includes a basic target steering speed calculating unit 21, a returning state response target value calculating unit 25, and a target value restricting unit 26. The basic target steering speed calculating unit 21 calculates a basic target steering speed ω* based on the steering angle θ. The basic target steering speed ω* is a basic value of the target steering speed when the steering wheel is returning to the neutral position.

The returning state response target value calculating unit 25 corrects the basic target steering speed ω* based on the return state quantity α calculated by the returning state determining means 50, and outputs a post-returning state response target steering speed ω. The target value restricting unit 26 calculates the target steering speed ω* based on the post-returning state response target steering speed ω and the steering speed ω. The target value restricting unit 26 thereby sets the lower-limit value of the absolute value of the target steering speed ω*. Detailed workings of the returning state response target value calculating unit 25 and the target value restricting unit 26 will be described hereafter.

The return control amount calculating unit 30 includes a steering speed deviation calculating unit 31, a steering speed servo controller 32, a steering angle reference torque calculating unit 33, and an adder 37. The steering speed deviation calculating unit 31 calculates a deviation Δω between the target steering speed ω* outputted by the target steering speed calculating unit 20 and the steering speed ω. The steering speed servo controller 32 performs servo control such that the steering speed deviation Δω becomes 0, that is, the steering speed ω follows the target steering speed ω*. The steering speed servo controller 32 calculates a basic return control amount Tr*_0.

The steering angle reference torque calculating unit 33 calculates a steering reference torque Tθ that is the returning force based on the steering angle θ. The adder 37 adds the steering angle reference torque T0 to the basic return control amount Tr*_0. The return control amount Tr* is thereby calculated. The return control amount calculating unit 30 outputs the return control amount Tr* calculated in this manner.

The configuration and workings of the returning state determining unit 50 will be described with reference to FIGS. 4 to 7.

The returning state determining unit 50 determines whether or not the steering state is the "returning state" based on the steering angle θ and the steering speed ω. Here, the steering angle θ corresponds to "steering wheel position-related information correlated with the steering wheel position." The value of the steering angle θ when the steering wheel is in the neutral position is 0. The value of the steering angle θ becomes positive or negative based on a rotation direction of the steering wheel from the neutral position. In addition, the steering speed ω corresponds to a "time rate of change of the steering wheel position-related information."

Figure 4:
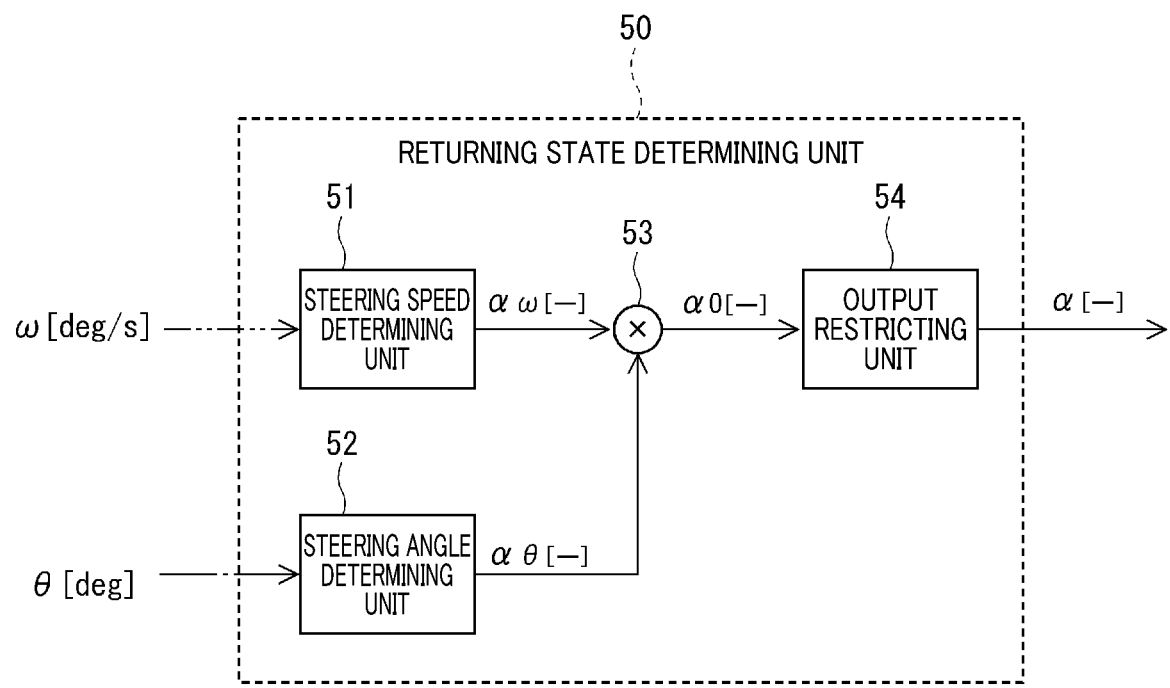
FIG. 4 is a control block diagram of a returning state determining unit.

As shown in FIG. 4, the returning state determining unit 50 includes a steering speed determining unit 51, a steering angle determining unit 52, a multiplier 53, and an output restricting unit 54. State quantities αω, αθ, α0, and α are each a dimensionless quantity [−].

Figure 5A:
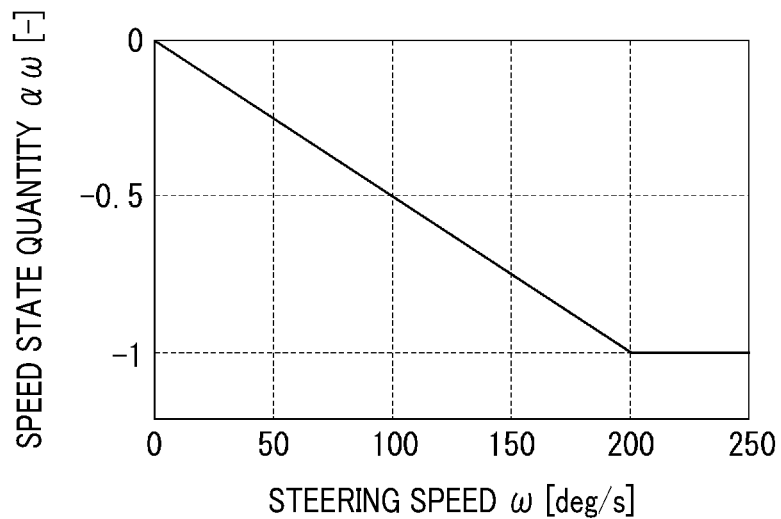
FIG. 5A is an example of a speed state quantity map.
Figure 5B:
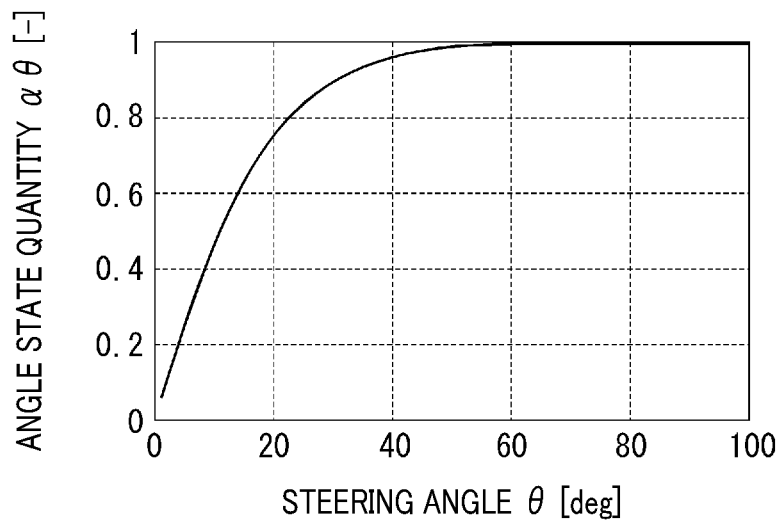
FIG. 5B is an example of an angle state quantity map of the returning state determining unit.

Maps in FIGS. 5A and 5B respectively show maps in which the steering speed ω and the steering angle θ are in the positive region. Maps in which the steering speed ω and the steering angle θ are in the negative region will appear to be symmetrical to the maps in FIGS. 5A and 5B with respect to the origin. Numeric values in the map are merely examples.

The steering speed determining unit 51 calculates a speed state quantity αω that is a value ranging from −1 to +1, based on the steering speed ω. The speed state quantity αω indicates that the steering wheel is rotating at a higher speed as the absolute value of the speed state quantity αω increases. Positive/negative of the value indicates the rotation direction.

Specifically, as shown in FIG. 5A, the speed state quantity αω is 0 when the steering speed ω is 0 [deg/s]. When the steering speed ω is positive, the speed state quantity αω decreases from 0 to −1 as the steering speed ω increases. When the steering speed ω is negative, the speed state quantity αω increases from 0 to +1 as the steering speed ω decreases.

The steering angle determining unit 52 calculates an angle state quantity αθ that is a value ranging from −1 to +1, based on the steering angle θ. The angle state quantity αθ indicates that the steering wheel is at a position farther from the neutral position as the absolute value of the angle state quantity αθ increases. Positive/negative of the value indicates the direction.

Specifically, as shown in FIG. 5B, the angle state quantity αθ is 0 when the steering angle θ is 0 [deg]. When the steering angle θ is positive, the angle state quantity αθ increases from 0 to +1 as the steering angle θ increases, and converges at about +1 when the steering angle θ is near 60 [deg]. When the steering angle θ is negative, the angle state quantity αθ decreases from 0 to −1 as the steering angle θ decreases, and converges at about −1 when the steering angle θ is near −60 [deg].

The multiplier 53 calculates a pre-restriction return state quantity α0 that is a value ranging from −1 to +1. The pre-restriction return state quantity α0 is a product of the speed state quantity αω and the angle state quantity αθ.

Figure 6:
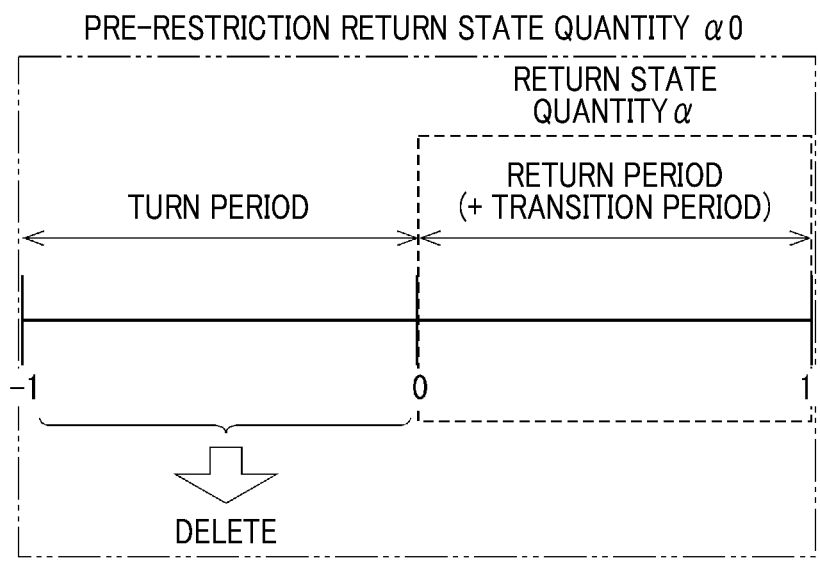
FIG. 6 is a diagram for explaining restriction of a return control amount by an output restricting unit.

As shown in FIG. 6, the output restricting unit 54 deletes "negative values ranging from −1 to 0" of the pre-restriction return state quantity α0. The "negative values ranging from −1 to 0" correspond to values during the turn period and are unnecessary in calculations described hereafter. The output restricting unit 54 then outputs only "positive values ranging from 0 to +1" to the returning state response target value calculating unit 25 of the target steering speed calculating unit 20, as the return state quantity α. The "positive values ranging from 0 to +1" correspond to values during the return period or the transition period.

Figure 7:
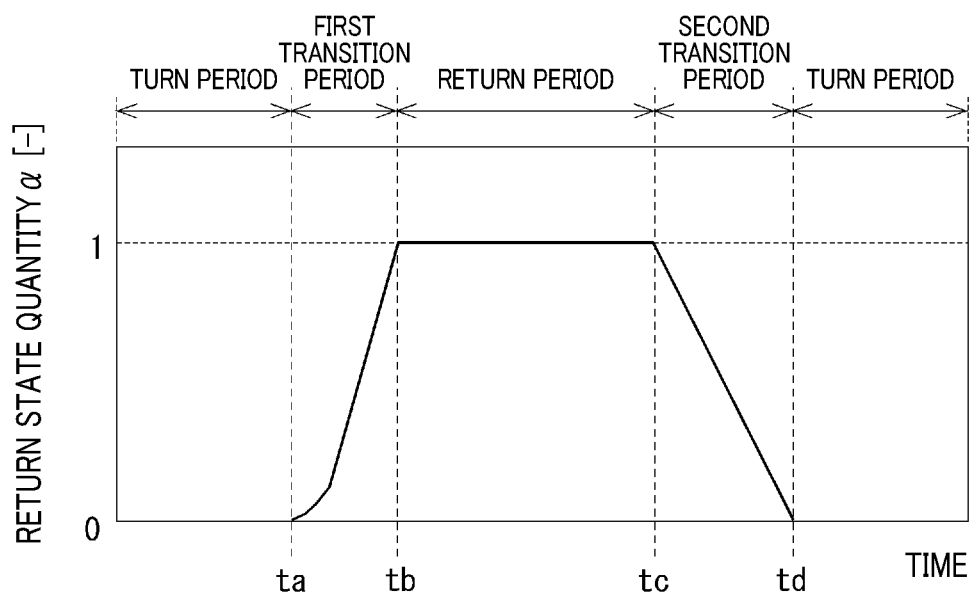
FIG. 7 is actual apparatus data indicating changes in a return state quantity based on a steering state.

FIG. 7 shows actual apparatus data of the return state quantity α during turn steering at a low speed and from a large steering angle. During the turn periods before time ta and after time td, the return state quantity α is 0. During the first transition period from time ta to time tb, the return state quantity α increases from 0 to 1. During the return period from time tb to time tc, the return state quantity α is 1. During the second transition period from time tc to time td, the return state quantity α decreases from 1 to 0. As the actual apparatus data indicates, the steering state can be determined to be in the return period when 1 is outputted as the return state quantity α.

As described above, according to the present embodiment, the sign of the pre-restriction return state quantity α0 is determined based on the product of the angle state quantity αθ and the speed state quantity αω. That is, when the signs of the steering angle θ and the steering speed ω differ, the pre-restriction return state quantity α0 is positive. A determination is made that the steering state is the returning state or the transitioning state. That is, the steering state switches between the returning state or the transitioning state, and the turning state at the neutral position at which the steering angle θ is 0.

When a determination is made based on the product of the signs of the steering torque Ts and the steering speed ω, the sign of Ts×ω becomes positive during the period in which the steering angle θ is increasing, regardless of whether the steering angle θ is positive or negative, when the steering torque Ts in the positive direction is being applied. Meanwhile, the sign of Ts×ω becomes positive during the period in which the steering angle θ is decreasing, regardless of whether the steering angle θ is positive or negative, when the steering torque Ts in the negative direction is being applied. That is, Ts×ω does not switch between positive and negative at the neutral position at which the steering angle θ is 0. Therefore, according to the present embodiment, the determination regarding the returning state is not made based on the steering torque Ts and the steering speed ω.

Next, details of calculation processes performed by the returning state response target value calculating unit 25 and the target value restricting unit 26 of the target steering speed calculating unit 20 will be described with reference to FIGS. 8A, 8B, 9, and 10.

Figure 8A:
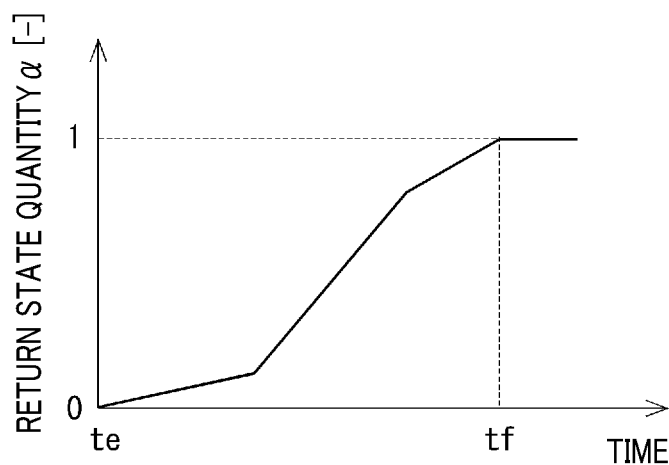
FIGS. 8A and 8B are diagrams for explaining returning state response target value calculation.
Figure 8B:
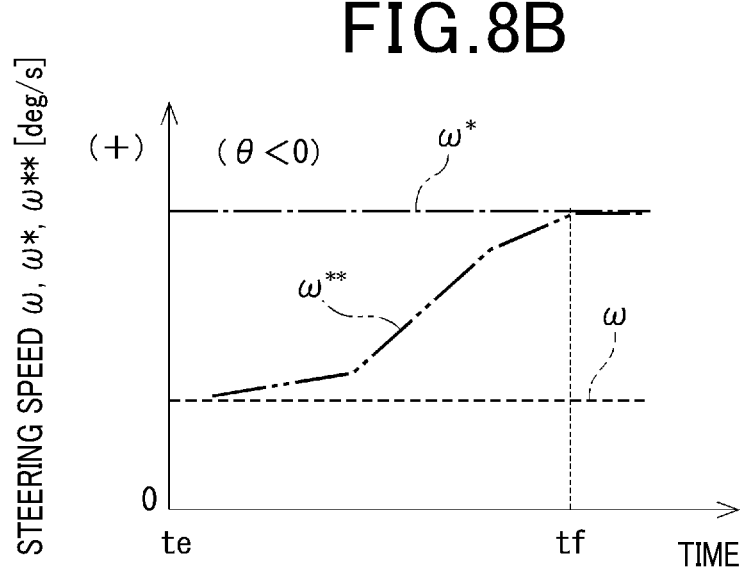

First, returning state response target value calculation performed by the returning state response target value calculating unit 25 will be described with reference to FIGS. 8A and 8B. FIGS. 8A and 8B have a common time axis.

FIG. 8A shows changes over time in the return state quantity α during the first transition period. The return state quantity α gradually increases from 0 to 1, from time te to time tf.

FIG. 8B shows changes in the post-returning state response target steering speed ω** accompanying the changes in the return state quantity α. Here, a case in which the steering angle θ is negative and the steering speed ω in the returning direction is positive is presumed. In FIG. 8B, the steering speed ω is indicated by a broken line. The basic target steering speed ω* is indicated by a single-dot chain line. The post-returning state response target steering speed ω** is indicated by a two-dot chain line.

The returning state response target value calculating unit 25 calculates the post-returning state response target steering speed ω** using an expression (1), based on the steering speed ω, the basic target steering speed ω*, and the return state quantity α.

$$\omega^{**}=\alpha\omega^*+(1-\alpha)\omega \tag{1}$$

Therefore, the post-returning state response target steering speed ω becomes closer to the steering speed ω as the return state quantity α becomes closer to 0. The post-returning state response target steering speed ω becomes closer to the basic target steering speed ω* as the return state quantity α becomes closer to 1.

Next, a calculation flow of a target value restriction process performed by the target value restricting unit 26 will be described with reference to FIGS. 9 and 10. The target value restriction process is a calculation performed to set the lower limit of the absolute value of the target steering speed ω*** to be equal to the steering speed ω. Symbol S in the description of the flowchart in FIG. 9 denotes "step."

In this calculation flow, first, at step S1, the target value restricting unit 26 determines the sign of the steering angle θ. A reason for this is that the determination of the relationship among the steering speeds ω, ω*, and ω*** with regard to magnitude is reversed depending on the sign of the steering angle θ.

When determined that the steering angle θ is positive, the target value restricting unit 26 determines YES at step S1 and proceeds to step S2. When determined that the steering angle θ is negative, the target value restricting unit 26 determines NO at step S1 and proceeds to step S5. When the steering angle θ is 0, in actuality, the steering angle θ is not required to be taken into consideration because the return steering is completed. The steering angle θ of 0 may be considered either positive or negative. At step S1, should the steering angle θ be 0, the target value restricting unit 26 makes a determination based on the determination made when the steering angle θ is positive.

When the steering angle θ is positive, the steering speed ω in the returning direction is negative. When the steering angle θ is negative, the steering speed ω in the returning direction is positive.

Figure 10:
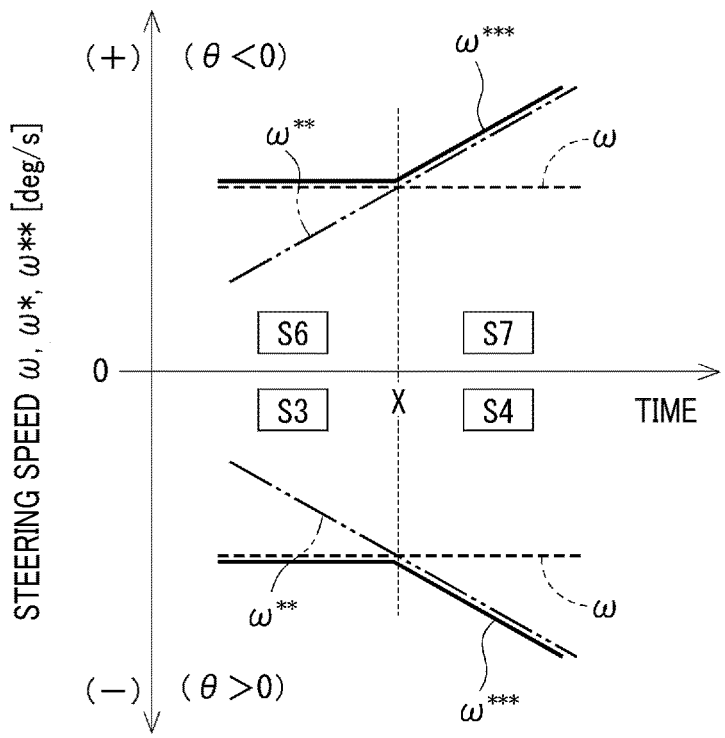
FIG. 10 is a diagram for explaining setting of a target steering speed in the target value restriction process.

FIG. 10 shows the setting of the target steering speed ω*, based on a premise that the steering speed ω is fixed in relation to time, and the absolute value of the post-returning state response target steering speed ω monotonically increases in relation to time. In FIG. 10, the steering speed ω is indicated by a broken line. The post-returning state response target steering speed ω is indicated by a two-dot chain line. The target steering speed ω* is indicated by a bold solid line. In addition, to prevent overlapping lines, the target steering speed ω*** is intentionally slightly displaced.

Figure 9:
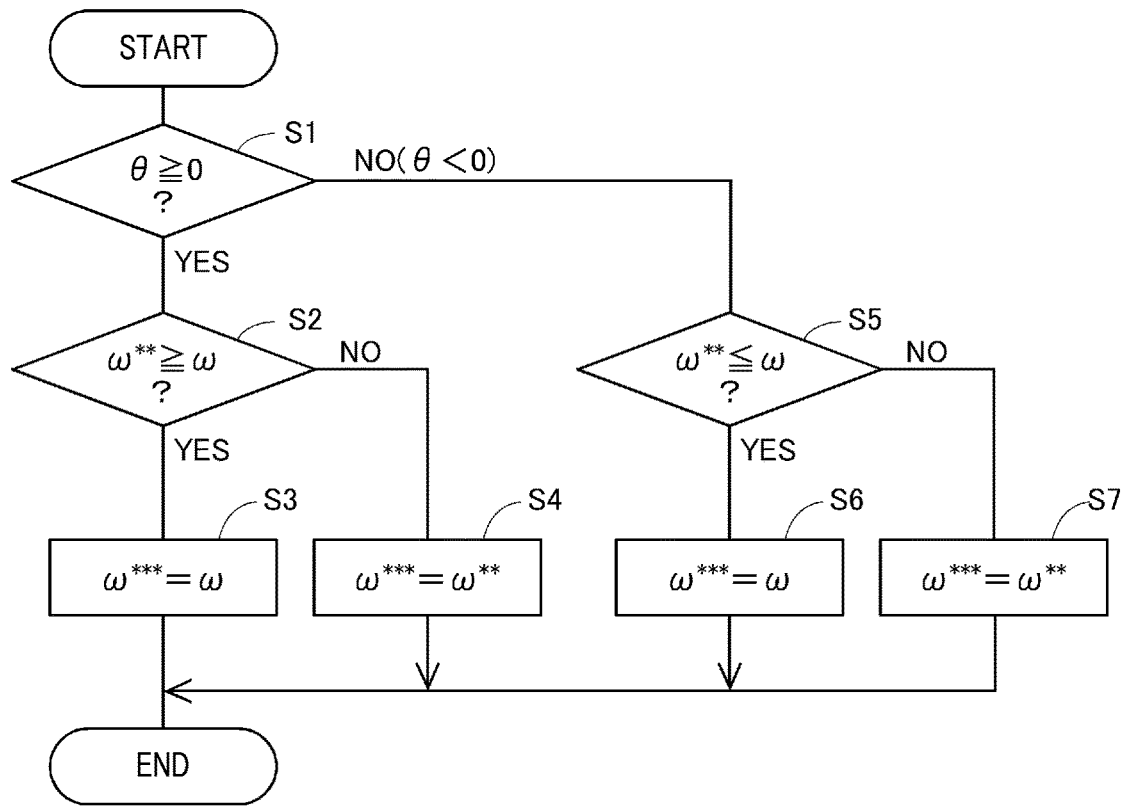
FIG. 9 is a flowchart of a target value restriction process.

Steps S2 to S4 in FIG. 9 are processes performed in cases in which the steering speed ω is negative, as shown in the lower half of FIG. 10. Steps S5 to S7 in FIG. 9 are processes performed in cases in which the steering speed ω is positive, as indicated in the upper half of FIG. 10.

At S2, the target value restricting unit 26 determines whether or not the negative post-returning state response target steering speed $\omega^{}$ is equal to or greater than the steering speed $\omega$. The target value restricting unit 26 determines YES at step S2, before time X. At step S3, the target value restricting unit 26 sets the target steering speed $\omega^{*}$ to be equal to the steering speed $\omega$. The target value restricting unit 26 determines NO at step S2, after time X. At step S4, the target value restricting unit 26 sets the target steering speed $\omega^{*}$ to be equal to the post-returning state response target steering speed $\omega^{}$.

At step S5, the target value restricting unit 26 determines whether or not the positive post-returning state response target steering speed $\omega^{}$ is equal to or less than the steering speed $\omega$. The target value restricting unit 26 determines YES at step S5, before time X. At step S6, the target value restricting unit 26 sets the target steering speed $\omega^{*}$ to be equal to the steering speed $\omega$. The target value restricting unit 26 determines NO at step S5, after time X. At step S7, the target value restricting unit 26 sets the target steering speed $\omega^{*}$ to be equal to the post-returning state response target steering speed $\omega^{}$.

As a result of the above-described calculation flow, the target steering speed $\omega^{***}$ is set to be equal to the steering speed $\omega$ in the regions of steps S3 and S6. Therefore, the basic return control amount $Tr^*\_0$ outputted by the steering speed servo controller 32 of the return control amount calculating unit 30 is 0. Consequently, steering by the driver being inhibited by the output of the return control can be prevented.

In addition, in the regions of steps S4 and S7, the returning speed of the steering wheel is gradually increased as a result of the absolute value of the target steering speed $\omega^{***}$ being gradually increased from the absolute value of the steering speed $\omega$ that is the lower-limit value. Consequently, the returning speed of the steering wheel suddenly increasing and causing the driver discomfort, as occurs in the conventional technology in Japanese Patent Publication No. 4959217, can be prevented.

Next, actual apparatus data obtained when the target steering speed calculation process according to the present embodiment is performed will be described with reference to FIGS. 11A, 11B, 11c, and 12.

Figure 11A:
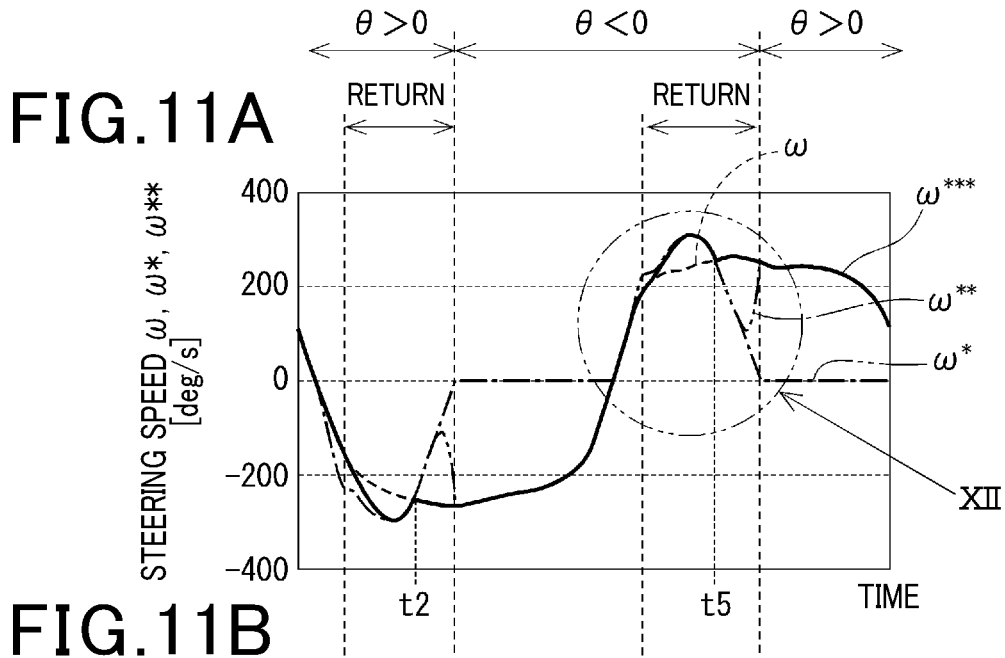
FIGS. 11A to 11C are actual apparatus data indicating working effects of a target steering speed calculation process.
Figure 11B:
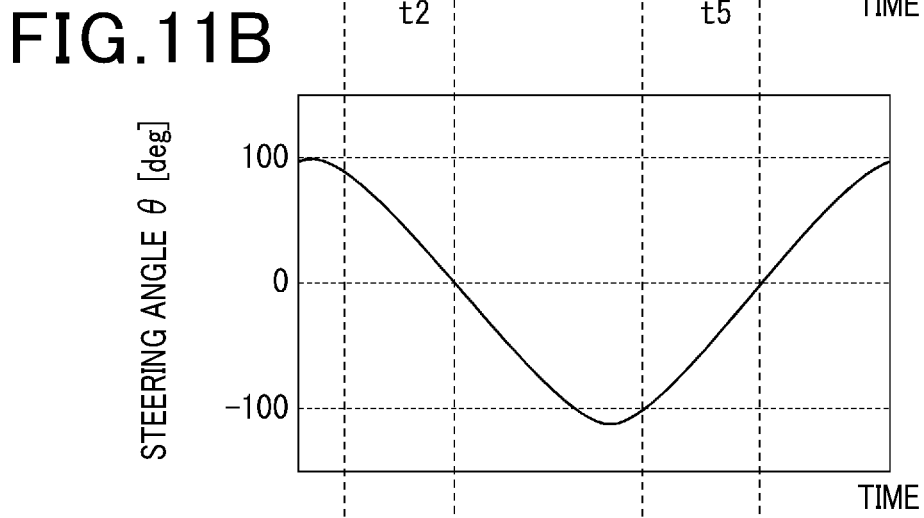
Figure 11C:
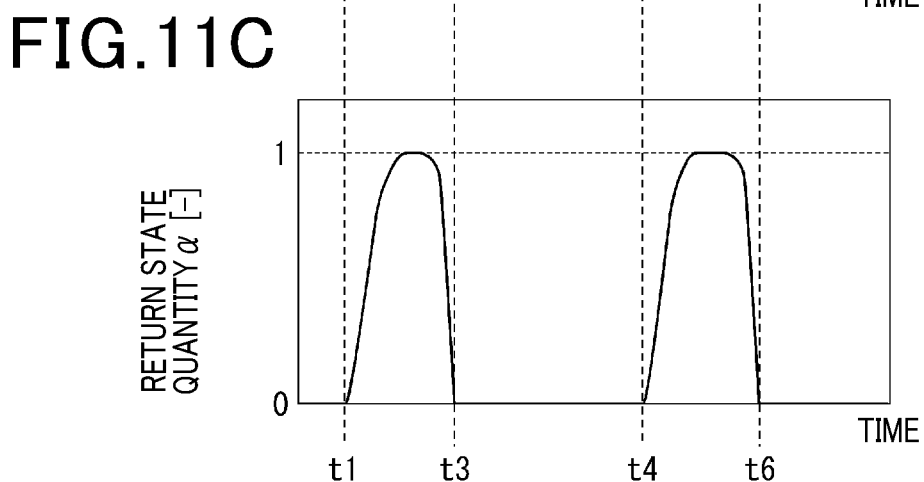

A horizontal axis in each of FIGS. 11A, 11B, and 11C indicates a common time axis. A vertical axis in FIG. 11A indicates the steering speeds $\omega$, $\omega^{}$, and $\omega^{*}$. A vertical axis in FIG. 11B indicates the steering angle $\theta$. A vertical axis in FIG. 11C indicates the return state quantity $\alpha$. In FIGS. 11A and in 12, which is an enlarged view of section XII in FIG. 11A, the steering speed $\omega$ is indicated by a broken line. The basic target steering speed $\omega^*$ is indicated by a single-dot chain line. The post-returning state response target steering speed $\omega^{}$ is indicated by a two-dot chain line. The target steering speed $\omega^{*}$ is indicated by a bold solid line.

As shown in FIG. 11B, the actual apparatus data shows test results of a case in which slalom steering is performed over a steering angle range of about ±100 [deg]. Periods from time t1 to time t3 and from time t4 to time t6 when the steering angle $\theta$ is returning to the neutral position correspond to the return period. As shown in FIG. 11C, the return state quantity $\alpha$ rises from 0 to 1.

As shown in FIG. 11A, the change in steering speed $\omega$ is relatively flat during the return period. However, the basic target steering speed $\omega^*$ and the post-returning state response target steering speed $\omega^{}$ change such as to form steep peaks. After the absolute value exceeds the steering speed $\omega$, the absolute value again falls below the steering speed $\omega$. The times at which the absolute value of the post-returning state response target steering speed $\omega^{}$ falls below the steering speed $\omega$ are t2 and t5.

Figure 12:
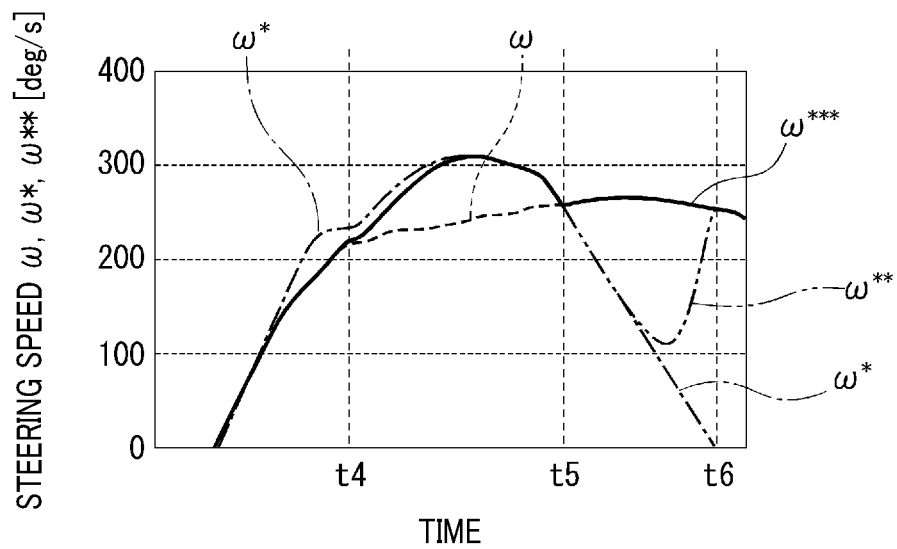
FIG. 12 is an enlarged view of FIG. 11A.

Next, details of the changes in the target steering speed $\omega^{*}$ will be described with reference to FIG. 12. During the period before time t4, the return state quantity $\alpha$ is 0. The target steering speed $\omega^{*}$ matches the steering speed $\omega$. That is, in FIG. 12, the bold solid line overlaps the broken line. During the period from time t4 to time t5, the return state quantity $\alpha$ increases from 0 to 1. The target steering speed $\omega^{***}$ responds to the increase in the return state quantity $\alpha$, and gradually increases from the steering speed $\omega$ indicated by the broken line to the basic target steering speed $\omega^*$ indicated by the single-dot chain line. That is, the target steering speed $\omega^{*}$ gradually increases. During the period from time t5 to time t6, relationships "$\theta<0$" and "$\omega^{}<\omega$" are established. Therefore, as a result of S6 in FIG. 1, "$\omega^{*}=\omega$," that is, the target steering speed $\omega^{*}$ is set to be equal to the steering speed $\omega$.

As described above, according to the present embodiment, when the steering state is not the returning state, the target steering speed $\omega^{***}$ matches the steering speed $\omega$. The steering speed deviation $\Delta\omega$ is 0. Therefore, the return control amount $Tr^*$ is not outputted by the return control amount calculating unit 30. Consequently, turn steering by the driver is not inhibited.

In addition, in the returning state, the target steering speed $\omega^{***}$ gradually increases from the steering speed $\omega$. Sudden change in the returning speed is thereby suppressed. The return control amount calculating unit 30 outputs the return control amount $Tr^*$ such that the steering speed $\omega$ is brought closer to the target steering speed $\omega^{***}$ and the steering speed deviation $\Delta\omega$ becomes 0. Consequently, steering load placed on the driver in the returning direction can be reduced.

Other Embodiments (1) According to the above-described embodiment, the steering angle $\theta$ and the steering speed $\omega$ are used as the "steering wheel position-related information correlated with the steering wheel position" and the "time rate of change of the steering wheel position-related information" in the calculation of the return state quantity $\alpha$ by the returning state determining unit 50. According to another embodiment, steering wheel position-related information such as a motor rotation angle, a rotation angle of a transmission system gear, a steering angle of a tire, or a yaw rate may be used instead of the steering angle $\theta$. The time rate of change of such steering wheel position-related information may be used instead of the steering speed $\omega$.

(2) According to the above-described embodiment, the maps are used for calculation of the speed state quantity $\alpha\omega$ and the angle state quantity $\alpha\theta$. However, calculation of the state quantities is not limited to the method in which a map is used. The state quantities may be calculated by mathematical formulas.

(3) Specific configurations in FIG. 3 according to the above-described embodiment may be modified as appropriate, as long as the workings of the present disclosure can be achieved.

The present disclosure is not limited in any way by the above-described embodiment. Various embodiments are possible without departing from the spirit of the present disclosure.

What is claimed is:

1. A steering control apparatus that controls an assistance torque outputted by a steering assistance motor based on a steering torque applied by a driver, the steering control apparatus comprising:
   a basic assistance torque calculating unit that calculates a basic assistance torque; and
   a return control unit that calculates a return control amount to assist in returning a steering wheel to a neutral position, as a correction torque to be added to the basic assistance torque, wherein
   the return control unit includes
      a target steering speed calculating unit that calculates a target steering speed that is a target value for a steering speed,
      a return control amount calculating unit that calculates the return control amount such that the steering speed follows the target steering speed, and
      a returning state determining unit that determines whether the steering wheel is turning or returning, and
   the target steering speed calculating unit gradually increases an absolute value of the target steering speed from an absolute value of the steering speed when the steering wheel is returning.

2. The steering control apparatus according to claim 1, wherein:
   the returning state determining unit determines whether the steering wheel is in a turning state in which the steering wheel position is changing in a direction away from the neutral position or a returning state in which the steering wheel position is changing in a direction towards the neutral position.

3. The steering control apparatus according to claim 2, wherein:
   the target steering speed calculating unit sets the target steering speed to be equal to the steering speed in the turning state.

4. The steering control apparatus according to claim 3, wherein:
   the returning state determining unit determines the returning state based on a return state quantity calculated from steering wheel position-related information correlated with the steering wheel position and a time rate of change of the steering wheel position-related information.

5. The steering control apparatus according to claim 4, wherein:
   the steering wheel position-related information is a steering angle;
   the time rate of change of the steering wheel position-related information is the steering speed; and
   the returning state determining unit calculates the return state quantity based on a product of an angle state quantity determined based on the steering angle and a speed state quantity determined based on the steering speed.

6. The steering control apparatus according to claim 2, wherein:
   the returning state determining unit determines the returning state based on a return state quantity calculated from steering wheel position-related information correlated with the steering wheel position and a time rate of change of the steering wheel position-related information.

7. The steering control apparatus according to claim 6, wherein:
   the steering wheel position-related information is a steering angle;
   the time rate of change of the steering wheel position-related information is the steering speed; and
   the returning state determining unit calculates the return state quantity based on a product of an angle state quantity determined based on the steering angle and a speed state quantity determined based on the steering speed.

* * * * *